March 5, 1968  OSAMU MAEDA  3,371,937
SEALING DEVICE FOR BEARINGS

Filed June 7, 1965  2 Sheets-Sheet 1

Inventor
Osamu Maeda
By Dressler, Goldsmith,
Clement, Gordon & Ladd.
Attys

March 5, 1968  OSAMU MAEDA  3,371,937
SEALING DEVICE FOR BEARINGS
Filed June 7, 1965  2 Sheets-Sheet 2

Inventor
Osamu Maeda
By Dressler, Goldsmith
Clement, Gordon & Ladd.
Attys.

United States Patent Office
3,371,937
Patented Mar. 5, 1968

3,371,937
SEALING DEVICE FOR BEARINGS
Osamu Maeda, Nishiku, Osaka, Japan, assignor to Toyo Bearing Manufacturing Company Limited
Filed June 7, 1965, Ser. No. 461,899
Claims priority, application Japan, Mar. 20, 1965, 40/16,394
4 Claims. (Cl. 277—189)

ABSTRACT OF THE DISCLOSURE

A bearing assembly for a railway car truck is shown with an outer race having a counterbore provided with an endless groove to releasably receive a seal casing having a cylindrical section for interference fit within the counterbore. The seal casing has a set of integral tongue portions in partly severed relation thereon and projecting in outwardly inclined relation at circumferentially spaced locations to confront endwise against the shoulder for resisting axial extraction of the seal casing from the outer race, the tongues being resiliently inwardly deflectable in response to an axial retraction force that is determined by the amount of projection of the tongues. In another embodiment, a second set of integral tongues are provided in alternating axially spaced relation to the first set and of lesser projection to provide the aforementioned interference fit with the counterbore.

---

The present device offers an improved sealing structure to be mounted on the counterbored portion of the outer race of a bearing.

Heretofore, various sealing devices for bearings have been designed to seal in lubricant and seal out dust and moisture. Each one of these devices, however, had flaws in the method of mounting on the outer race of bearings. Those which could be mounted with ease were not securely held in place; those which could be firmly fixed in place were difficult to mount and dismount, making them unsuitable where frequent replacement was necessary. Furthermore, when an attempt was made to hold a sealing device firmly in position through interference between the diameter of the counterbore of the outer race and the outer diameter of the sealing device, the outside diameter of the counterbored part of the outer race expanded when there was a large amount of interference, causing deterioration in the accuracy of the outer race and malfunctioning of the bearing.

Especially in a bearing assembly mounted on a railway car truck, which receives violent impacts and vibrations, the seal device is acted upon by strong forces that tend to disengage it from the outer race. The life expectancy required of a bearing is about ten years. During that period, it is necessary to remove and reinstall the seal several times for inspection of the bearing and re-greasing. Therefore, it is essential that removal and reinstallation operations be effected with ease and the seal be fixed firmly in place even after several such operations. The present invention fulfills these requirements by providing suitable interference between the outside diameter of the seal and bore diameter of the counterbore of the outer race, and projecting resilient tongue pieces to snap into the annular raceway on the counterbore wall of the outer race.

FIG. 7 is a longitudinal sectional view of a portion of another embodiment of the present device while

Figure 1:
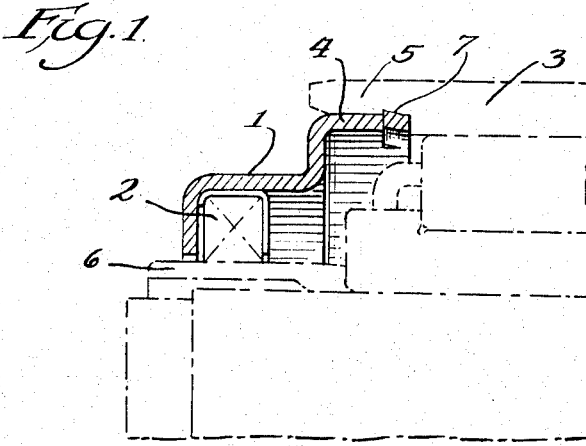
FIG. 1 is a longitudinal sectional view of the present sealing device mounted on a bearing.

In the following, the present device is explained by referring to the drawings.

FIG. 1 shows the sealing device of the present design installed and fixed securely in place in the outer race of a bearing. The casing of the seal, formed by pressing sheet metal, has two cylindrical sections 1, 4. An oil seal 2 is fitted in cylindrical section 1. The cylindrical section 4 is fitted into the counterbored portion 5 of outer race 3 of the bearing, thereby fixing the entire seal to the outer race of the bearing.

Numeral 6 designates a shaft or slinger having its cylindrical surface in contact with the oil seal lip in order to effect the sealing action.

Figure 2:
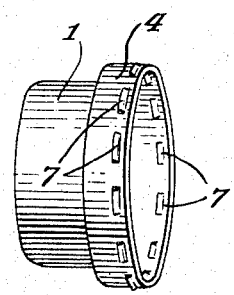
FIG. 2 is a perspective view, FIG. 3 a longitudinal sectional view and FIG. 4 a front elevation respectively of the present sealing device.
Figure 4:
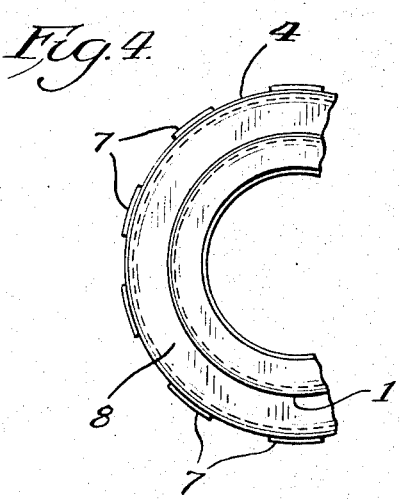
Figure 3:
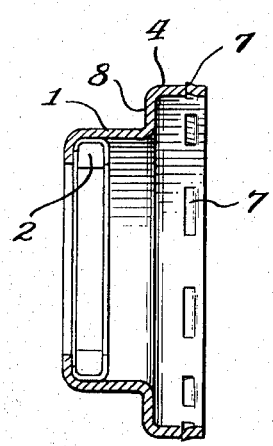

The structure of the seal device is shown in detail by FIGS. 2, 3 and 4. Referring to FIGS. 3 and 4, tongue pieces 7, intermittently spaced and projecting outwardly from the outside diameter of cylindrical section 4, are provided on the cylindrical surface of said cylindrical section. Tongue pieces 7 are made by punching or pressing from the inner surface of cylindrical section 4 after the casing of the seal is formed by sheet metal processes.

Figure 5:
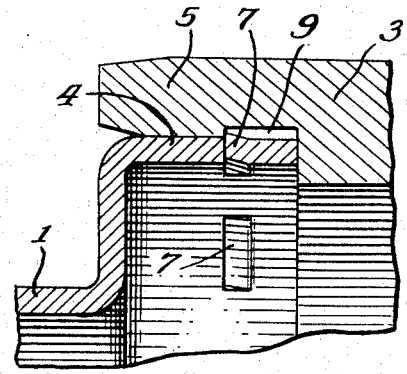
FIG. 5 is an enlarged view of the fitting portion of the present device.

FIG. 5 is an enlarged view of the engagement of cylindrical section 4 and counterbored portion 5 of the outer race. The annular raceway 9 is provided on the wall of counterbored portion 5. When the seal is mounted, aforesaid tongue pieces 7 snap into raceway 9 and the edges of the tongue pieces hook engage with the side of said raceway. This manner of engagement strongly resists any force tending to disengage the seal from the outer race. The diameter at the bottom of raceway 9 is made slightly greater than the diameter of the outer edges of tongue pieces 7.

In the present sealing device, the amount of interference between the outside diameter of cylindrical portion 4 and the bore diameter of the counterbored portion of the outer race is predetermined. When the sealing device is press-fitted into the counterbore through the latter's chamfered entrance, the tongue pieces are press-fitted with an interference far greater than that of cylindrical section 4. However, due to the spring action of the tongue pieces, the resistance to press-fitting is small. When the sealing device reaches the prescribed position, tongue pieces 7 engage raceway 9 and are freed from interference. Thus their original diameter is restored by their spring action and they hook against the side of the raceway. In this manner, the sealing device is securely fixed radially due to the interference of its cylindrical section 4 and axially due to the engagement of tongue pieces 7 and raceway 9, especially in the direction of its removal.

As the present sealing device is press-fitted easily with a comparatively small force, it is mounted with ease but a far greater force is required in pulling it out than in press-fitting it in. The large force required in pulling out the sealing device is that which is expended when tongue pieces 7 are disengaged from raceway 9. Therefore, by adapting a suitable form for the side of raceway 9 or by selecting a suitable amount of projection for tongue pieces 7, the pull-out force can be adjusted with ease depending on where the bearing is used. The sealing device is pulled out by applying a removing tool against the inner side of vertical surface 8 of the seal casing. After tongue pieces 7 are disengaged from raceway 9, the sealing device can be pulled out merely with a force which can overcome the resistance due to the interference between the tongue pieces and the bore diameter of counterbored portion 5. The spring action of the tongue pieces does not affect the pull-out force to any noticeable extent. When the sealing device is pulled out of the outer race, the tongues pieces 7 spring back to their original form. The spring action of tongue pieces depends of course on the resilience of the material used for the casing but can be modified to a certain extent by adjusting the amount of projection and depth of cut, an advantage which enables it to be fitted to design dimensions suitable for anticipated uses.

Figure 6:
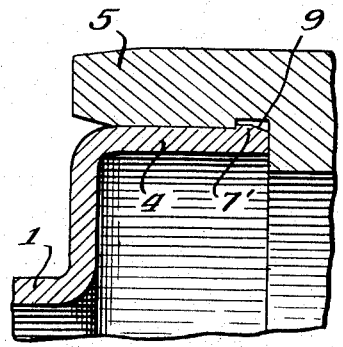
FIG. 6 is an enlarged view of the fitting portion of a known sealing device.

In contrast, the past device, shown in FIG. 6 is such that a continuous projection of 7' provided along the circumference at the end of cylindrical portion 4 engages raceway 9 in the counterbored portion 5 of the outer race so as to prevent the sealing device from slipping out axially. With the above structure itbecomes necessary that in press-fitting the sealing device the entire projection 7' contract diametrically. Therefore, a large force is required in press-fitting the device as well as in pulling it out, with the result that the projection becomes permanently deformed and worn out in mounting and dismounting, and gradually loses the capacity to hold the sealing device securely in place, becoming unfit for repeated mounting and dismounting.

The present sealing device as explained in the foregoing is simple in structure, can be mounted with ease owing to the spring action of the tongue pieces and is securely held in place in the outer race because of its large resistance to disengaging forces. Therefore, the device is especially suitable for use when intense vibration is encountered such as in a bearing used on railway car trucks. Furthermore, the device can be dismounted repeatedly whenever necessary without decreasing its resistance to disengaging forces. Thus it is able to withstand a very long period of use. As the casing is formed by sheet metal processes and the tongue pieces are formed by punch or press, the present sealing device can be mass-produced with ease.

Figure 7:
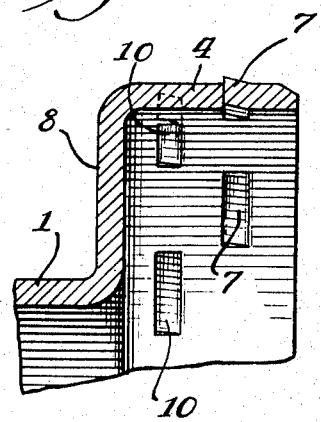
Figure 8:
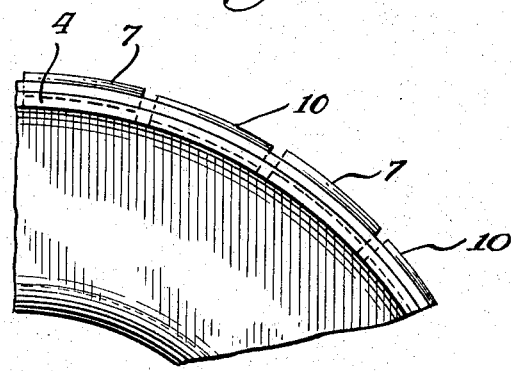
FIG. 8 is a front elevation of the same.

FIGS. 7 and 8 show another embodiment of the principle of the present invention, namely, adoption of the spring action of the tongue pieces to the sealing device is further applied to the cylindrical section of the device. In the example of FIG. 1, the interference between the bore diameter of counterbored portion 5 of the outer race and the outside diameter of cylindrical section 4 of the sealing device requires that the outside diameter of the outer race shall not expand to any appreciable degree and that the sealing device shall be firmly fixed in place. These conditions necessitate that the bore diameter of the counterbored portion and the outside diameter of the cylindrical section mentioned above be finished to high precision. Especially, the outside diameter of cylindrical section 4 of the sealing device subjected to sheet metal working tends to assume an ellipsoidal form and when it is press-fitted into the counterbored portion of outer race in this form, the outer race also assumes a similar form, destroying the structural precision of bearings and decreasing effectiveness. In the example of FIGS. 7 and 8, a small value is assigned to the interference of the cylindrical section in such a way that it will not cause distortion of the outer race, and the interference necessary to fix the sealing device securely in place is given by the interference of the outside diameter of tongue pieces 10. In this case, the spring force of the tongue pieces allows a range of interference far greater than that in the case of FIG. 6 and a sealing device possessing required fixative power can be offered economically.

What is claimed is:

1. In a seal casing for an outer race of a bearing, said outer race having a counterbore wall portion provided with an endless groove to present a recessed annular shoulder and said seal casing having a cylindrical section for press fit insertion into and forcible extraction from said counterbore wall portion, the improvement wherein said cylindrical section has an interference fit with said counterbore wall portion and has a set of integral tongue portions in partly severed relation to said cylindrical section and projecting in outwardly inclined relation at circumferentially spaced locations to confront and engage axially against said shoulder for resisting extraction of said seal casing from said outer race, said tongues being resiliently inwardly deflectable to disengage from said shoulder in response to a predetermined axial retraction force applied to said seal casing.

2. In a seal casing in accordance with claim 1 and wherein said cylindrical section has a second set of integral tongue portions axially spaced from the first-named set, said tongues of said second set being in partly severed relation to said cylindrical section and projecting in outwardly inclined relation at circumferentially spaced locations to engage in resiliently inwardly deflectable interference fit relation with said counterbore wall portion.

3. In a seal casing in accordance with claim 2 and wherein the tongues of said second set are disposed in alternating relation with the tongues of said first set and project outwardly less than the tongues of said first set.

4. In a bearing assembly that includes a seal casing releasably retained in an outer race, said outer race having a counterbore wall portion provided with an endless groove to present a recessed annular shoulder and said seal casing having a cylindrical section for press fit insertion into and forcible extraction from said counterbore wall portion, the improvement wherein said cylindrical section has an interference fit with said counterbore wall portion and has a set of integral tongue portions in partly severed relation to said cylindrical section and projecting in outwardly inclined relation at circumferentially spaced locations to confront and engage axially against said shoulder for resisting extraction of said seal casing from said outer race, said tongues being resiliently inwardly deflectable to disengage from said shoulder in response to a predetermined axial retraction force applied to said seal casing.

References Cited

UNITED STATES PATENTS

| 1,661,674 | 3/1928 | Osborn | 285—319 |
| 1,871,033 | 8/1932 | Bott | 277—182 X |
| 2,879,114 | 3/1959 | Bowen | 277—153 X |

SAMUEL ROTHBERG, *Primary Examiner.*